United States Patent [19]
Pearson

[11] Patent Number: 6,042,461
[45] Date of Patent: Mar. 28, 2000

[54] MOUNTING ASSEMBLY

[75] Inventor: Foster Lynn Pearson, Paducah, Ky.

[73] Assignee: Matweld, Inc., Paducah, Ky.

[21] Appl. No.: 09/189,659

[22] Filed: Nov. 10, 1998

[51] Int. Cl.[7] .............................. B24B 23/00; B24B 27/08
[52] U.S. Cl. ........................ 451/359; 451/342; 451/353; 451/357
[58] Field of Search ..................... 83/666, 665, 698.41; 403/383, 374.4; 451/342, 353, 360, 359, 357, 344, 489, 509, 510; 409/234, 232; 279/8, 9, 102

[56] References Cited

U.S. PATENT DOCUMENTS

| | | | |
|---|---|---|---|
| 2,540,793 | 2/1951 | Metzger | 451/342 |
| 2,572,042 | 10/1951 | Martin | 451/342 |
| 3,266,535 | 8/1966 | Brodie | 83/666 |
| 4,267,759 | 5/1981 | Sullivan et al. | 83/665 |
| 4,393,626 | 7/1983 | Schroer | 451/342 |
| 5,020,280 | 6/1991 | O'Relly | 451/342 |

*Primary Examiner*—Derris Holt Banks
*Attorney, Agent, or Firm*—Lloyd L. Zickert

[57] ABSTRACT

A flange or mounting assembly for mounting a cutting tool on a drive shaft of a motor, which includes an inner flange having a spindle, an outer flange and fastening means for retaining the outer flange on the spindle of the inner flange and for maintaining the cutting tool in frictional engagement with the flanges, wherein the flanges include means for preventing relative rotation therebetween so that the flange assembly is particularly adaptable for use on bi-rotational power equipment.

32 Claims, 2 Drawing Sheets

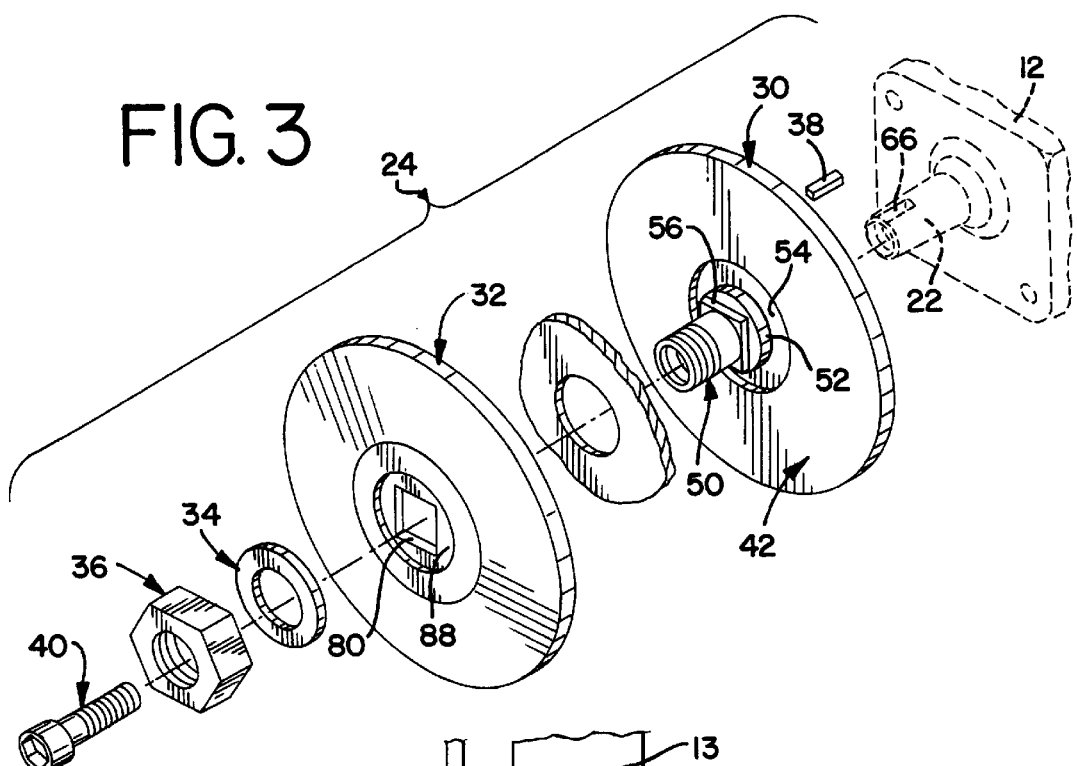
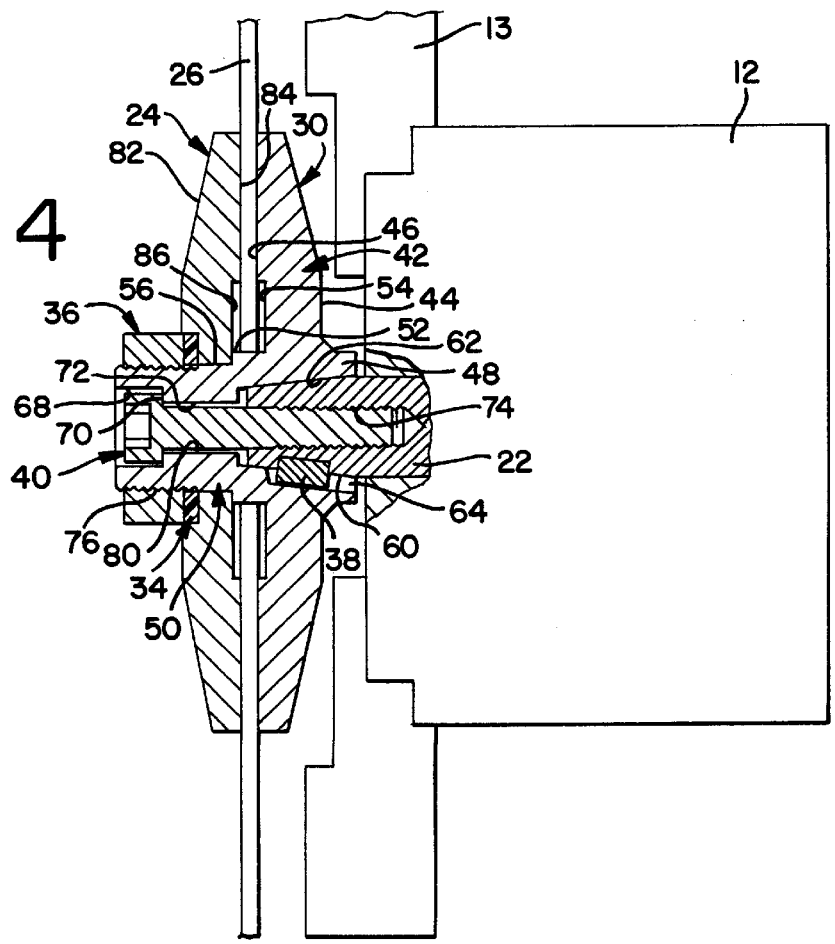

MOUNTING ASSEMBLY

DESCRIPTION

This invention relates in general to a mounting assembly or flange assembly for mounting and securing a circular blade or grinding wheel to bi-rotational power equipment, and more particularly to an improved mounting assembly that prevents the mounting assembly from coming loose when rotation is reversed.

BACKGROUND OF THE INVENTION

Mounting assemblies are commonly used in rotational power equipment to secure an abrasive wheel, grinding stone or circular blade (generally "cutting tool") to a motor drive shaft to allow for the rotational movement of the cutting device. Such mounting assemblies generally utilize a pair of mounting plates or flanges between which the cutting tool is held and supported. One of the mounting plates usually includes a spindle for receiving the cutting tool and the other mounting plate. The other plate includes a bore for receiving the spindle, and a retaining nut or fastener threaded on the spindle to hold the plates together and frictionally grip the cutting device. A drive connection, such as a woodruff key or spline, is employed to transfer power between the drive shaft of the power equipment and the spindle and the mounting plates.

During use, dynamic forces can cause a threaded fastener on the spindle to loosen in the mounting assembly. One method to overcome this problem is to manufacture the spindle with either left- or right-hand threads as dictated by the direction of drive rotation. However, requiring left- or right-hand threads requires extra parts inventory. Furthermore, users may make mistakes in identifying the thread direction in the spindle and therefore order the wrong parts.

SUMMARY OF THE INVENTION

The present invention obviates the problems involved in securely maintaining a cutting tool in a mounting assembly on a shaft of rotational power equipment, regardless of the rotational direction, by providing a mounting assembly that utilizes two interconnecting mounting plates or flanges. One of the plates includes a spindle for receiving the cutting tool and the other mounting plate. The mounting plates are structured to retain the cutting tool on a drive shaft and prevent the mounting plates from individually rotating relative to each other. The invention therefore prevents loosening of the plates on bi-rotational or unirotational power equipment.

The inner mounting plate or flange includes an integrally formed spindle having a tapered bore that mates with a tapered drive shaft on a hydraulic or other type of drive motor. It should be appreciated that the bore of the spindle may be non-tapered when made for a non-tapered shaft. A round shoulder, and a square shoulder which is smaller and located adjacent the round shoulder, are formed on the base of the spindle where it is connected to the inner flange. The round shoulder is sized to matingly receive the center hole of a cutting tool to allow the cutting tool to lay flat against the inner mounting plate and properly locate the tool on the spindle. The outer mounting plate includes a square hole that is sized to mate with the square shoulder on the inner mounting plate in such a way that neither mounting plate may separately rotate. Thus, the mounting plates are locked together against relative rotation therebetween. The spindle of the inner mounting plate extends through the square hole on the outer mounting plate a sufficient distance to receive a washer and a hex nut to be torqued down against the outer plate, thereby securing the mounting plates and cutting tool to the spindle. The spindle is secured and keyed to a drive shaft of suitable rotational power equipment.

It is therefore an object of the present invention to provide a new and improved mounting assembly for securely maintaining a cutting tool on bi-rotational power equipment.

Another object of the present invention is to provide a mounting assembly for securing a cutting tool to a drive shaft of a motor, that will not loosen regardless of the rotational direction of the drive shaft.

Other objects, features, and advantages of the invention will be apparent from the following detailed description taken in conjunction with the accompanying sheets of drawings, wherein like reference numerals refer to like parts.

DESCRIPTION OF THE DRAWINGS

FIG. 3 is an exploded perspective view of the blade mounting assembly and a phantom view of the drive shaft of a hydraulic drive motor; and FIG. 4 is a cross-sectional view of the mounting assembly of FIG. 3 on the drive shaft of the motor.

DESCRIPTION OF THE INVENTION

Figure 2:
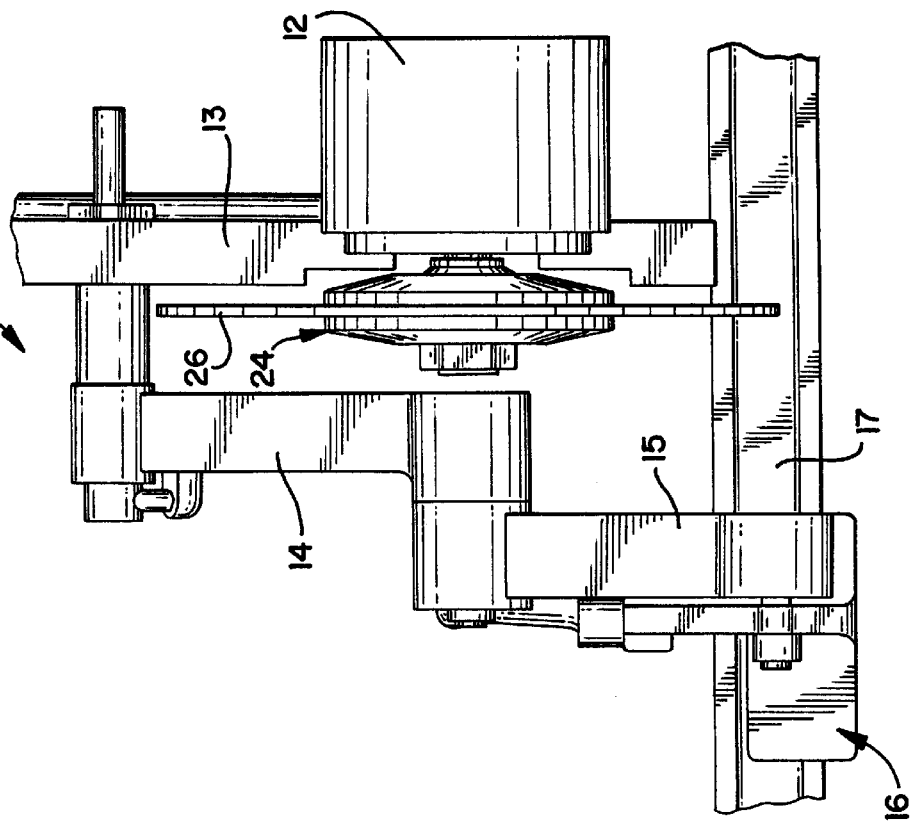
FIG. 2 is a fragmentary top plan view of the rail saw shown in FIG. 1.
Figure 1:
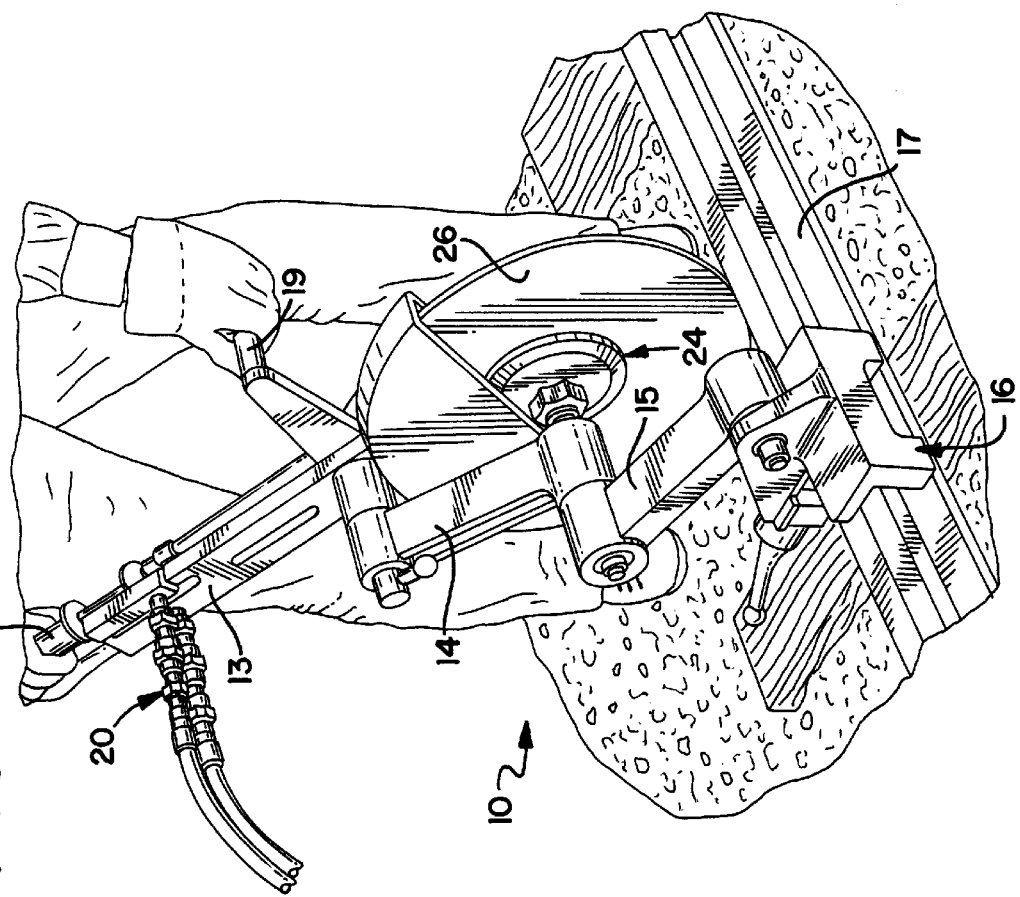
FIG. 1 is a perspective view of a rail saw mounted on a rail of a railroad track mounting assembly according to the present invention for securing an abrasive saw blade to the saw.

Referring now to the drawings, and particularly to FIGS. 1 and 2, a rail saw incorporating the flange assembly or cutting tool mounting assembly of the invention is illustrated in connection with use of a circular saw blade to cut a rail of a railroad track. The rail saw is hydraulically powered and generally indicated by the numeral 10. The saw includes a hydraulic motor 12 carried on a supporting arm 13 that is in turn connected to pivotally connected lever arms 14 and 15. A clamping fixture 16 that may be selectively clamped along a rail 17 allows the saw to be moved along the rail to a desired position. Handles 18 and 19 are provided on the supporting arm 13 for gripping and supporting the saw by the operator. Hydraulic hoses 20 extend from the supporting arm 13 and go to a suitable source of high-pressure hydraulic fluid source for driving the hydraulic motor 12. Suitable controls are also provided on the supporting arm 13 for energizing the motor 12.

The hydraulic motor 12 includes a drive shaft 22 on which the flange assembly of the present invention, generally indicated by the numeral 24, is mounted for securing the cutting tool 26 in the form of a circular saw blade to a drive shaft.

Referring now to FIGS. 3 and 4, the mounting or flange assembly according to the invention for mounting a cutting tool on a shaft includes generally an inner flange 30 having a spindle, an outer flange 32, a washer 34, and a hex nut 36. Additionally, in order to lock the assembly to the drive shaft 22, a woodruff key 38 is provided that coacts with the inner flange 30, and a machine screw 40 is provided to secure the inner flange 30 to the drive shaft 22.

The inner flange 30 including the spindle is preferably one piece and machined from a suitable steel. However, it should be appreciated that the inner flange may be of two or more pieces providing the pieces are mounted together to co-rotate, and they may be made of any suitable type of material and by any other suitable method. The inner flange 30 includes a flange 42. The flange includes a backside 44, and a front side 46 which provides an annular flat face against which the cutting tool or saw 26 will bear when it is mounted in place on the spindle. A hub 48 is provided centrally of the flange 42 for purposes of providing sufficient strength at the area where the flange is mounted onto the drive shaft 22. Power from the drive shaft is transferred to the hub. A spindle 50 extends from the front face 46 of the flange 42. At the base of the spindle where it connects to the flange, a round shoulder 52 is provided which will matingly receive a round hole of the cutting tool 26. Thus, the shoulder aligns with and centrally locates the saw blade 26 on the spindle. An annular recess 54 is provided in the front face of the flange 42 which surrounds the round shoulder 52 and provides a relief at the very center area where the saw blade 26 will be disposed.

The external face of the spindle 50 additionally includes a square shoulder 56 for receiving the outer flange as will be explained further below. The square shoulder 56 is disposed directly adjacent the round shoulder 52 and is preferably sized such that the round shoulder is at least equal to or slightly larger than a circular plane going through the four corners of the square shoulder, as shown particularly in FIG. 3.

The drive shaft 22 of the motor preferably includes a tapered surface 60 that is matingly received within a tapered bore 62 of the inner flange. It will be appreciated that the drive shaft receiving bore of the inner flange may be non-tapered for fitting on a non-tapered shaft if so desired. Additionally, in order to interconnect the inner flange so that it co-rotates with the drive shaft 22, a keyway 64 is provided in the bore 62 of the flange 42 which receives the woodruff key 38 that is also received in a keyway socket 66 formed on the drive shaft 22. It can also be appreciated that the drive shaft may be splined to receive a spline bore of the inner flange for locking the inner flange against rotation on the drive shaft.

At the outer end of the spindle 50, a counterbore 68 is provided which defines a shoulder 70 at the machine screw bore 72 for receiving the machine screw 40. The head of the machine screw bears against the shoulder 70 and the machine screw is threadedly received within a threaded bore 74 of the drive shaft 22 for the purpose of securing the inner flange to the drive shaft. The outer surface of the spindle 50 also is provided with a threaded portion 76 for receiving the hex nut 36 as will be more clearly explained below. Thus, the spindle receives the cutting tool, the outer flange and the fastening means for tightly forcing the flanges together to frictionally grip a cutting tool.

The outer flange 24 is essentially disc shaped and includes a square hole 80 to matingly fit on the square shoulder 56 of the spindle when the outer flange is mounted on the spindle to retain the circular saw blade in place. The outer flange 24 additionally includes an outer face 82 and an inner face 84 wherein the inner face is provided with a flat surface to bear against the saw blade 26 when in mounted position. Centrally of the inner side or face is an annular recess or relief area 86 about the same size as the recess 54 on the inner flange. The outer face of the outer flange includes a counterbore 88 within which the washer 34 is matingly received when in place. The outer flange 26 is preferably machined from heat-treated billet aluminum and therefore of lighter weight than steel in order to reduce overhung loading.

Preferably, the washer 34 is of nylon or any suitable plastic or pliant material that will have some compressibility so that when the nut 36 is tightened in place, it will slightly compress the washer. It should also be appreciated that the square shoulder/square hole relationship of the inner and outer flanges may be reversed where the shoulder would be formed on the outer flange and the hole or socket would be formed on the inner flange. The nut 36 is sized so that it can fit within the counterbore 88 when it is in torqued down position to apply a compressive force against the washer.

It should also be appreciated that the inner flange and spindle and the outer flange may be made of suitable materials in order to properly support a saw blade, grinding wheel, or other cutting or surface treatment tool.

In operation, the inner flange 30 is mounted on the drive shaft 22 with the key 38 in place to lock the flange to the shaft. The machine screw 40 is inserted into and secured in the threaded bore of the shaft to secure the inner flange to the shaft. The circular saw blade 26 is mounted in place on the round shoulder 52 of the spindle 50. The outer flange 24 is mounted in place on the spindle where the square hole 80 mates on the square shoulder 56. The washer 34 is mounted on the spindle, and the hex nut 36 is threaded on the spindle until the nut is torqued down to define the desired frictional engagement of the blade with the flanges of the flange assembly. It will be appreciated that any suitable fastening device may be used to fasten the outer flange in place. It should be further appreciated the flanges could be assembled with a blade and then mounted on a drive shaft. In either case, the outer and inner flanges are locked together for co-rotation so that the assembly can be used on bi-rotational power equipment and resist loosening during use.

It will be understood that modifications and variations may be effected without departing from the scope of the novel concepts of the present invention, and it is understood that this application is to be limited only by the scope of the appended claims.

The invention is hereby claimed as follows:

1. A rotational mounting assembly for mounting a cutting tool on a drive shaft of a drive motor, said rotational mounting assembly comprising:

an inner mounting plate having a front side and a back side, a spindle extending centrally from said front side and received on said drive shaft, said spindle including means for receiving said cutting tool and means fastening said plate onto said drive shaft;

an outer mounting plate received on said spindle and having means coacting with means on said inner mounting plate to prevent rotation between said plates, and fastening means received on said spindle for locking tile outer mounting plate to the spindle and tightly retaining said cutting tool between said plates, whereby the means preventing rotation between the plates resists loosening of the assembly when used on bi-rotational power equipment.

2. The rotational mounting assembly as claimed in claim 1, wherein said spindle includes a bore extending therethrough to matingly engage said drive shaft.

3. The rotational mounting assembly as claimed in claim 1, which further includes means on said spindle coacting with means on the drive shaft to cause co-rotation therebetween.

4. The rotational mounting assembly as claimed in claim 1, wherein said spindle is integral with said inner mounting plate.

5. The rotational mounting assembly as claimed in claim 1, wherein said spindle and said drive shaft are tapered to matingly fit together.

6. The rotational mounting assembly as claimed in claim 1, wherein said fastening means comprises a washer and a fastener threadedly received on said spindle.

7. The rotational mounting assembly as claimed in claim 6, wherein a compressible washer is provided between the fastener and outer mounting plate.

8. The rotational mounting assembly as claimed in claim 7, wherein said outer mounting plate has a counter-bore sized to accommodate said washer.

9. The rotational mounting assembly as claimed in claim 7, wherein said washer is nylon.

10. The rotational mounting assembly as claimed in claim 1, wherein said inner mounting plate includes a round shoulder for matingly receiving the cutting tool.

11. The rotational mounting assembly as claimed in claim 10, wherein the means on said inner mounting plate preventing rotation between said plates includes a rectangular shoulder located adjacent said round shoulder and said means on said outer mounting plate preventing rotation between the plates includes a rectangular hole sized to matingly fit said square shoulder.

12. The rotational mounting assembly as claimed in claim 1, wherein said cutting tool is a grinding stone.

13. The rotational mounting assembly as claimed in claim 1, wherein said cutting tool is a circular cutting blade.

14. The rotational mounting assembly of claim 1, wherein one of said inner or outer mounting plates includes a shoulder for matingly receiving said cutting tool, and the means preventing rotation between said plates includes a polygonally shaped portion on one of said inner or outer mounting plates adjacent said shoulder and a socket portion on the other of said inner or outer mounting plates to matingly fit said polygonally shaped portion.

15. The rotational mounting assembly of claim 1, wherein said drive motor is hydraulically powered.

16. A flange assembly for securing a cutting tool on a drive shaft of a motor, said assembly comprising:

an inner flange having a spindle mountable on said drive shaft, said inner flange and spindle being one piece, means fastening said inner flange and spindle onto said drive shaft, an outer flange received on said spindle, said cutting tool being received on the spindle between said flanges;

means on said one-piece inner flange and spindle coacting with means on said outer flange to prevent relative rotation therebetween, and fastening means engaging said spindle for securing said outer flange thereon and for securing the cutting tool tightly between said flanges to frictionally drive said tool.

17. The assembly of claim 16, wherein a round shoulder is provided at the base of the spindle where it connects to the inner flange to matingly receive a hole in said cutting tool.

18. The assembly of claim 17, wherein said means on said inner flange and spindle and said outer flange preventing rotation therebetween includes a square shoulder adjacent said round shoulder for matingly receiving a square hole in said outer flange.

19. The assembly of claim 16, wherein said means on said inner flange and spindle and said outer flange preventing rotation therebetween includes a square shoulder on one of said inner flange and spindle or said outer flange and a mating square opening on the other of said inner flange and spindle or said outer flange.

20. The assembly of claim 19, wherein said square shoulder is on said inner flange and spindle and said square opening is on the outer flange.

21. The assembly of claim 16, wherein said fastening means includes a hex nut threadedly engaging said spindle.

22. The assembly of claim 21, which further includes a compression washer between said hex nut and said outer flange.

23. The assembly of claim 14, wherein the outer flange is made of a lighter material than said one-piece inner flange and spindle to reduce overhung loading.

24. The assembly of claim 16, wherein said means on said inner flange and spindle and said outer flange preventing rotation therebetween includes a polygonal shoulder on one of said inner flange and spindle or said outer flange and a mating polygonal opening on the other of said inner flange and spindle or said outer flange.

25. The mounting device of claim 16, wherein said motor is hydraulically powered.

26. A mounting device for mounting a rotatable circular cutting tool on a drive shaft of a motor which comprises:

an inner flange member secured to said drive shaft for co-rotation therewith, means fastening said inner flange member to said drive shaft, said flange member including a cutting tool engaging face, a spindle axially extending from said face and said spindle having a base, and a round shoulder at the base of said spindle for mating with a central opening in the cutting tool, an outer flange member receivable on said spindle having a cutting tool engaging face opposite the cutting tool engaging face of said inner flange member, means on said outer flange member coacting with means on said inner flange member connecting said flange members for co-rotation with each other, and fastening means received on said spindle and coacting with said spindle and said outer flange member to secure said flange members together and provide a compression/friction engagement between said flange members and said cutting tool and a compression/friction force between said fastening means and said outer flange.

27. The mounting device of claim 26, wherein said inner flange member includes a bore for matingly receiving said drive shaft.

28. The mounting device of claim 26, wherein said means connecting said flange members for co-rotation includes a polygonal shoulder on one of said flange members, and a mating polygonal socket on the other of said flange members.

29. The mounting device of claim 26, wherein said means connecting said flange members for co-rotation includes a polygonal shoulder on said inner flange member, and a mating polygonal opening on said outer flange member.

30. The mounting device of claim 26, wherein said fastening means includes a nut threadedly received on said spindle.

31. The mounting device of claim 30, wherein said fastening means further includes a plastic washer between said nut and said outer flange member.

32. The mounting device of claim 26, wherein said motor is hydraulically powered.

* * * * *

UNITED STATES PATENT AND TRADEMARK OFFICE
CERTIFICATE OF CORRECTION

PATENT NO. : 6,042,461
DATED : March 28, 2000
INVENTOR(S) : Foster Lynn Pearson

Page 1 of 1

It is certified that error appears in the above-identified patent and that said Letters Patent is hereby corrected as shown below:

Title page, Item [56],
References Cited, insert the following:

-- PUBLICATIONS

-- Rail Saw, Matweld, Inc., dated 5/95, 3 pages.
-- Drawing No. 04650, Matweld, Inc., dated 4/96, 2 pages. --.

Column 4,
Line 49, change "tile" to -- the --; and

Column 6,
Line 28, after the second occurrence of "face" insert a comma (,).

Signed and Sealed this

Thirteenth Day of November, 2001

Attest:

NICHOLAS P. GODICI
Attesting Officer
Acting Director of the United States Patent and Trademark Office